United States Patent Office 3,592,852
Patented July 13, 1971

---

3,592,852
SUBSTITUTED BENZYLIDENEAMINO GUANIDINE
William J. Houlihan and Robert E. Manning, Mountain Lakes, N.J., assignors to Sandoz-Wander, Inc., Hanover, N.J.
No Drawing. Filed Dec. 16, 1968, Ser. No. 784,270
Int. Cl. C07c *133/10*
U.S. Cl. 260—564
2 Claims

ABSTRACT OF THE DISCLOSURE

1 - (2,6 - dimethylbenzylideneamino)-3-hydroxyguanidine hydrochloride; this compound is useful as a hypotensive.

---

This invention relates to benzylideneamino guanidine, the acid addition salts thereof, and to methods for its preparation. The substituted benzylideneamino guanidine of this invention may be represented by the following structural formula:

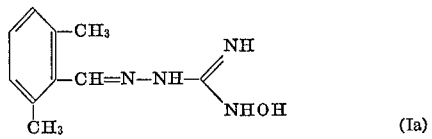
(Ia)

The compound of Formula Ia may also be illustrated by its tautomeric equivalents such as represented by the following structural formulas:

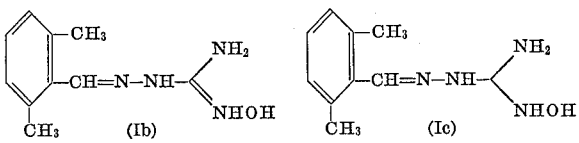

In order to simplify this description, however, Formula Ia only will be used. It should be nevertheless understood that the compound of Formula Ib and Ic may be represented as well as the compound of Formula Ia and the three tautomeric forms are within the concept of the present invention.

The process for preparing compound Ia may be represented as follows:

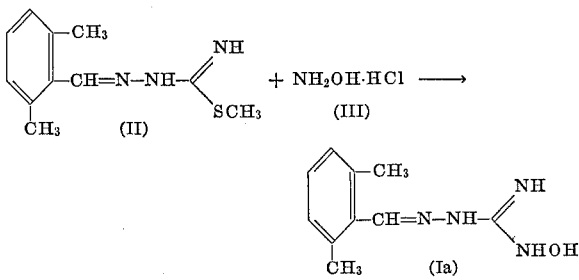

The compound of Formula Ia may be prepared by treating a dimethylbenzaldehyde S-loweralkylisothiosemicarbazone (II) with hydroxylamine (III) (the latter preferably as an acid addition salt, e.g., a hydrohalide such as the hydrochloride), in a solvent which dissolves both reactants, such as water in admixture with a loweralkanol, e.g., methanol or ethanol, or a tetrahydrofuran-water mixture, and the like. The reaction may be carried out at a temperature of about 10° C. to reflux temperature, preferably at about 20° C.–50° C. The particular solvent and temperature used is not critical in obtaining the compounds. Use of an acid addition salt of hydroxylamine (III) provides a corresponding salt of the benzylideneamino guanidine (Ia). The corresponding free base can be prepared from the salt in conventional manner.

The S-loweralkylisothiosemicarbazone (II) is prepared by treating a dimethylbenzaldehydethiosemicarbazone of the formula:

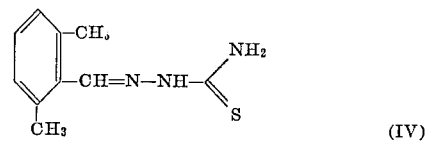
(IV)

in solvent with methyl iodide. This reaction may be conducted in solvent such as methylene chloride, tetrahydrofuran, benzene, alcohols, e.g., lower-alkanols such as methanol, ethanol and isopropanol, mixtures thereof, and the like, from about room temperature to the reflux temperature of the system, preferably 50°–80° C. Neither the particular solvent nor the reaction temperature is critical. The intermediate (II) is recovered by conventional techniques as the acid addition salt.

Said salt is converted to the free base (II) by treatment with sodium carbonate in solvent capable of dissolving the reactants such as water or a water-lower alkanol mixture at a temperature of from about 0° to about 50° C., conveniently about room temperature. These temperatures are not, however, critical in obtaining the free base.

The compound represented by Formula Ia above is useful because it possesses pharmaceutical properties in animals. In particular, this compound is useful as a hypotensive, as indicated by its activity in the anesthetized dog and cat given .1–.3 mg. of active material and tested by blood pressure measurement using a mercury manometer or transducer via a catheter inserted in the carotid or femoral artery. When so utilized, the compound may be combined with one or more pharmaceutically acceptable carriers or adjuvants. It may be administered orally or parenterally and, depending upon the compound employed and the mode of administration, the exact dosage utilized may vary.

Furthermore, the compound (Ia) may be similarly administered in the form of its non-toxic pharmaceutically acceptable acid addition salts. Such salts possess the same order of activity as the free base, are readily prepared by reacting the base with an appropriate acid and accordingly are included within the scope of the invention. Representative of such salts are the mineral acid salts, such as the hydrochloride, hydrobromide, sulfate, phosphate and the like and the organic acid salts, such as the succinate, benzoate, acetate, p-toluenesulfonate, benzene-sulfonate and the like.

In general, satisfactory results are obtained when this compound is administered at a daily dosage of about .01 milligram to about 10 milligrams per kilogram of animal body weight. This daily dosage is preferably administered 2 to 4 times a day, or in sustained release form. For most large mammals such as primates, the total daily dosage is from about 0.1 milligram to about 40.0 milligrams. Dosage forms suitable for internal use comprise from about 0.25 milligram to about 20 milligrams of the active compound in intimate admixture with a solid or liquid pharmaceutically acceptable carrier or diluent.

A representative formulation suitable for oral administration is a tablet prepared by standard tabletting techniques which contains the following:

| Ingredient: | Parts by weight |
|---|---|
| 1 - (2,6-dimethylbenzylideneamino)-3-hydroxyguanidine hydrochloride | 10 |
| Tragacanth | 2 |
| Lactose | 79.5 |
| Corn starch | 5 |
| Talcum | 3 |
| Magnesium stearate | 0.5 |

The following example is provided for the purpose of illustration and not by way of limitation. It is not intended so as to limit the scope of the invention as defined in the appended claims.

EXAMPLE 1-(2,6-dimethylbenzylideneamino)-3-hydroxy-guanidine hydrochloride

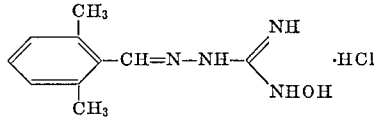

A mixture of 2,6-dimethylbenzaldehyde 1-methylisothiosemicarbazone (14.0 gms.), hydroxylamine hydrochloride (8.7 gms.), ethanol (150 ml.) and water (15 ml.) was stirred at room temperature for 48 hours. The solution was evaporated in vacuo and the residue dissolved in 50 ml. of 2 N hydrochloric acid, 200 ml. of water and 250 ml. of ether. The aqueous phase was separated, washed with 250 ml. of ether and then treated with 25 ml. of concentrated NH₄OH. The resultant solid, 1-(2,6-dimethylbenzylideneamino)-3-hydroxyguanidine, was collected by filtration and dried and then converted to the hydrochloride salt in methanol-ether with dry hydrogen chloride gas passed into the solution. The resultant mixture was evaporated in vacuo to give the title product 1-(2,6-dimethylbenzylideneamino)-3-hydroxyguanidine hydrochloride M.P. 190°–192° C.

What is claimed is:
1. A compound of the formula

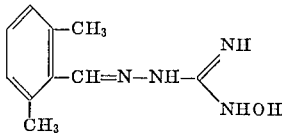

and salts thereof with pharmaceutically acceptable acids.

2. The compound of claim 1 which is 1-(2,6-dimethylbenzylideneamino)-3-hydroxyguanidine hydrochloride

References Cited

UNITED STATES PATENTS 3,377,381   4/1968   Langis et al. _____ 260—564

OTHER REFERENCES

Walker: Proc. Soc. Exp. Biol. and Med., vol. 98, pp. 7–9 (1958).

BERNARD HELFIN, Primary Examiner

G. A. SCHWARTZ, Assistant Examiner

U.S. Cl. X.R.

424—326; 260—552